United States Patent [19]

Hare

[11] 4,203,633
[45] May 20, 1980

[54] REDUCED NOISE PRODUCING IDLER WHEEL

[75] Inventor: Ronald B. Hare, Sunnyvale, Calif.

[73] Assignee: FMC Corporation, San Jose, Calif.

[21] Appl. No.: 927,070

[22] Filed: Jul. 24, 1978

[51] Int. Cl.² .................... B62D 55/12; B62D 55/14
[52] U.S. Cl. ................................. 305/28; 305/34; 305/57; 74/230.5; 74/443
[58] Field of Search ............... 305/56, 57, 42, 21, 305/28, 34; 74/230.5, 230.6, 443; 301/96, 95

[56] References Cited

U.S. PATENT DOCUMENTS 2,390,542  12/1945  Knox ........................... 305/42

FOREIGN PATENT DOCUMENTS 623095  3/1927  France ........................ 74/230.6
849310  8/1939  France ........................ 305/32
469722  7/1937  United Kingdom ........... 305/56

*Primary Examiner*—David A. Scherbel
*Attorney, Agent, or Firm*—J. F. Verhoeven; R. S. Kelly; H. M. Stanley

[57] ABSTRACT

A high speed tracked vehicle has a sprocket extending from each side thereof coupled to an engine through which driving power is supplied to each of a pair of driving tracks. The driving tracks are supported on either side of the vehicle hull by an idler wheel and the driving sprocket. A plurality of ground wheels distributes the vehicle weight over that portion of the tracks in contact with the surface underlying the vehicle. The tracks include a plurality of interconnected shoes each of which includes an inner elastomeric insert disposed to contact the idler wheel at the rim. Idler wheel rim and track shoe contact being a source of mechanical vibrations causing internal hull noise, one or more continuous peripheral ridges or crowns are formed on the rims so that the area of contact between the rims and the elastomeric inserts is reduced and the compliance of the system is increased. When multiple crowns are present, the crown on a larger radius makes initial contact with the elastomeric inserts absorbing most of the momentum of the shoe directed in a direction normal to the rim, and the crown on a lesser radius subsequently makes contact with the inserts to reduce compliance and thereby prevent rim contact with the metal portions of the shoes.

6 Claims, 5 Drawing Figures

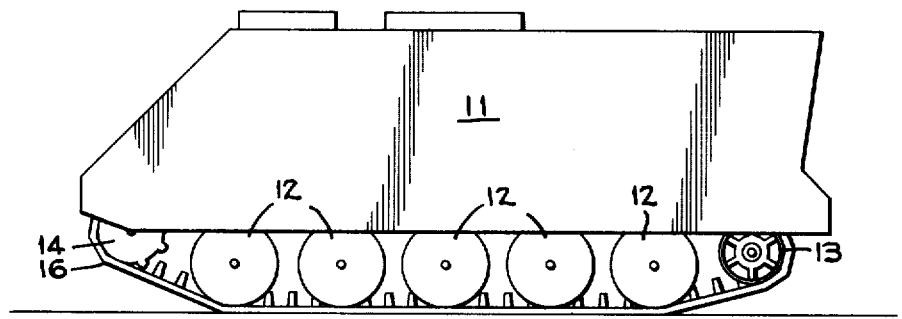
FIG_1
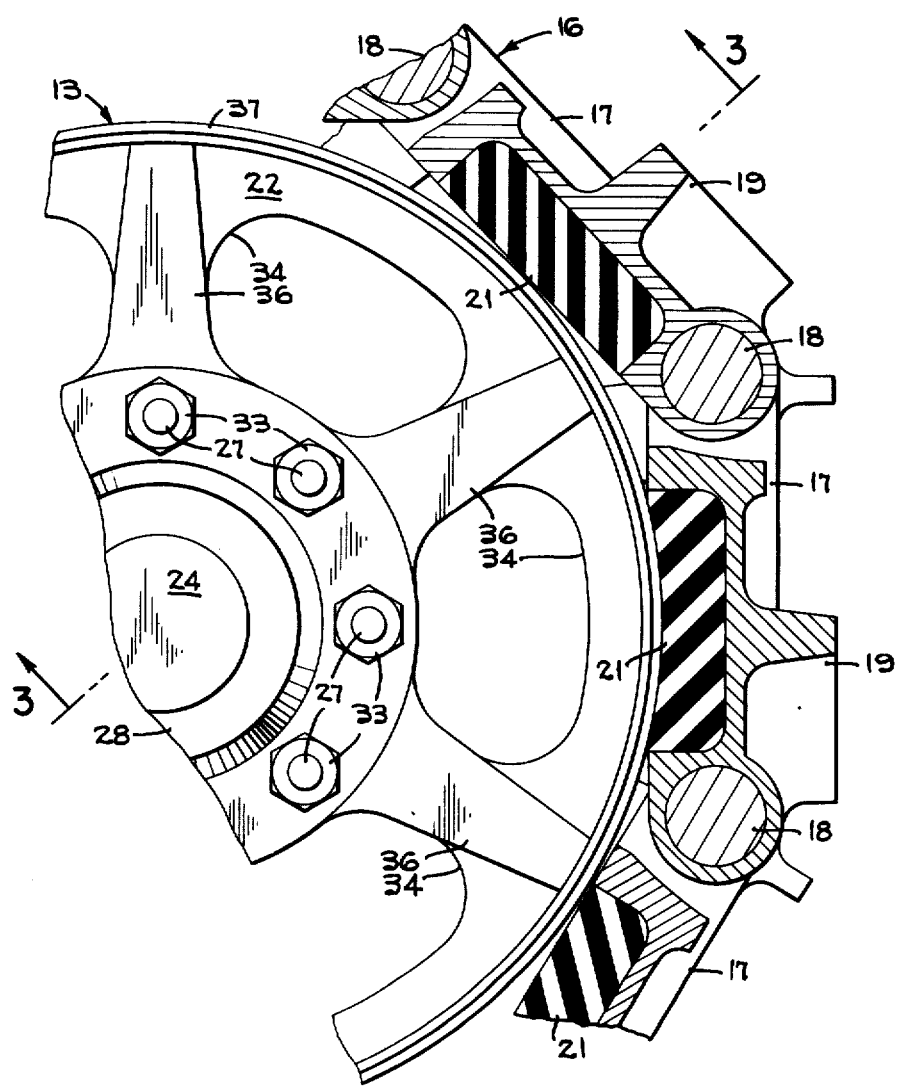
FIG_2

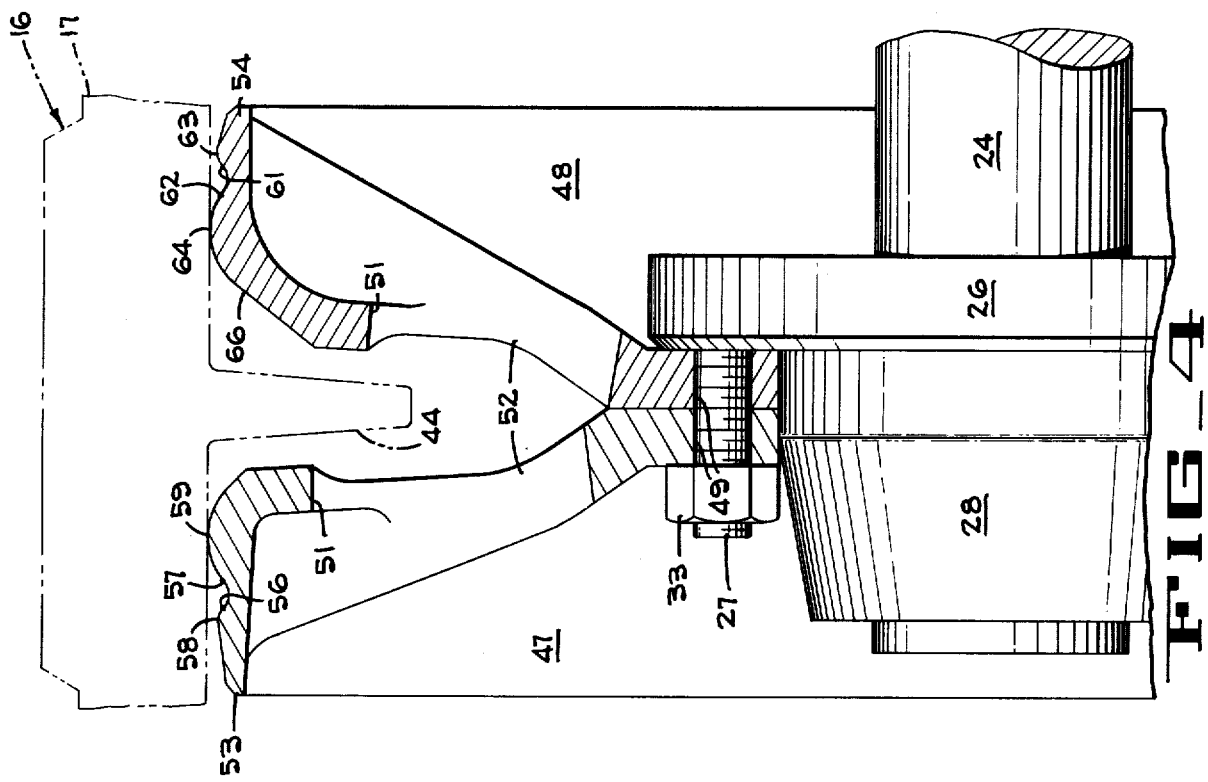
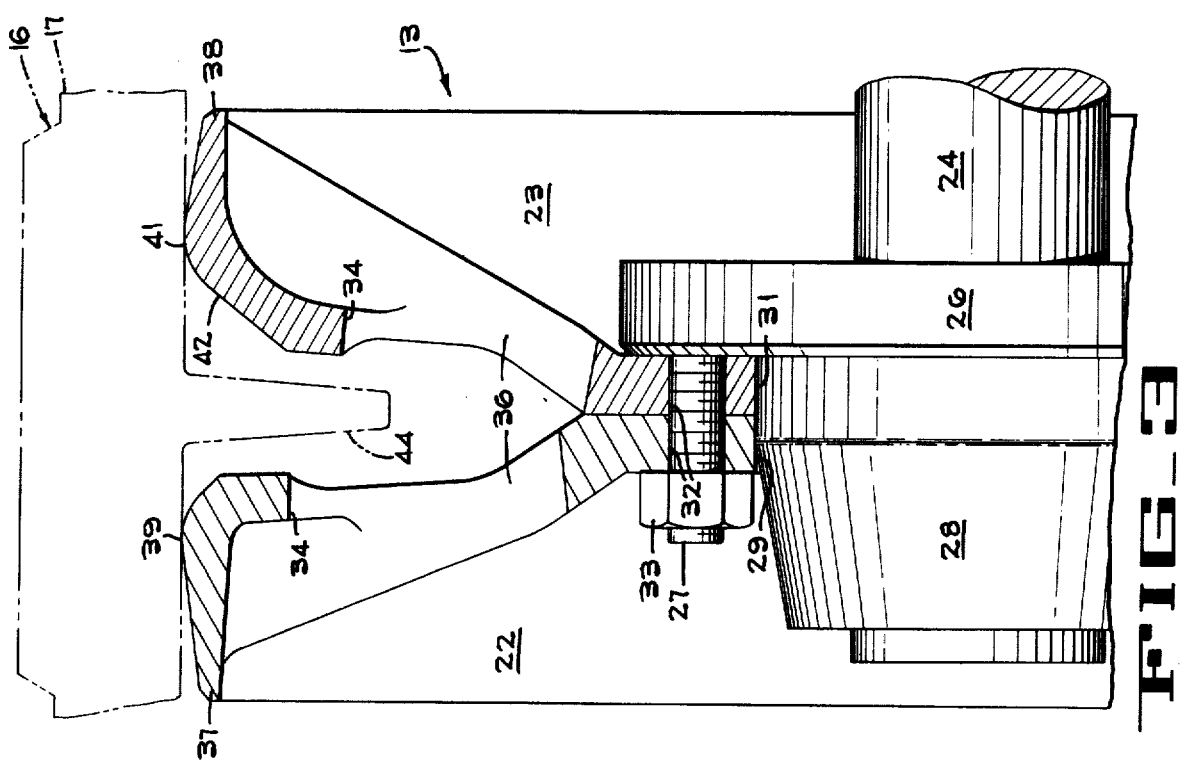

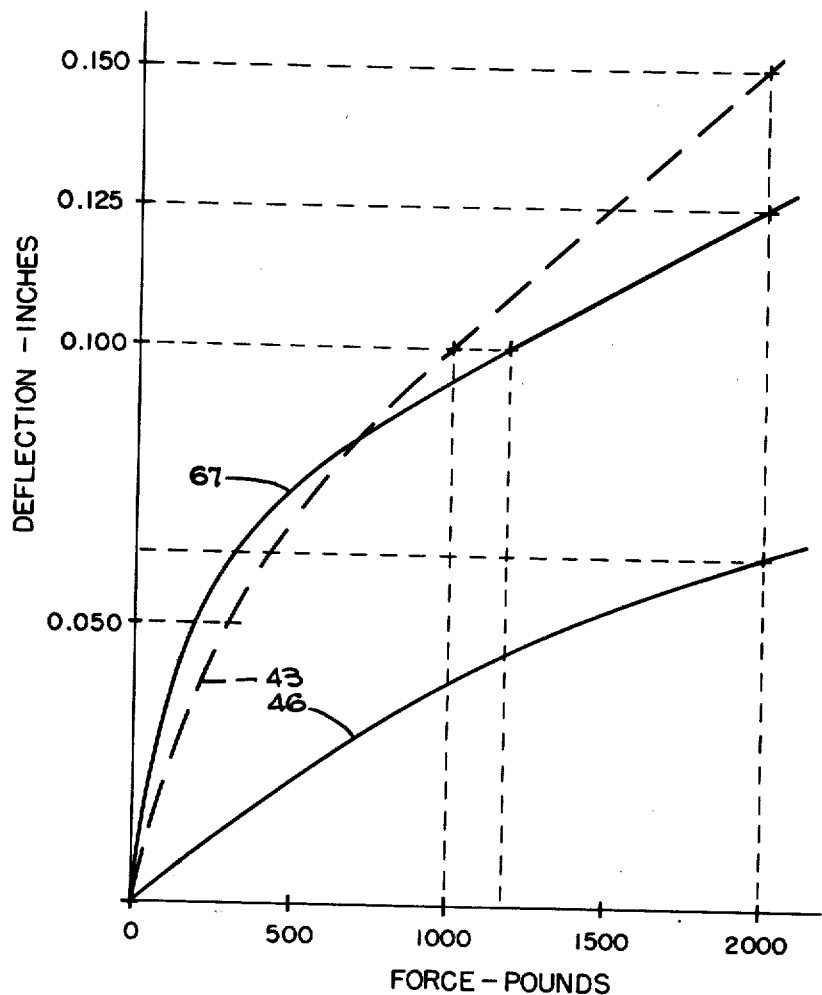
FIG_5

4,203,633

REDUCED NOISE PRODUCING IDLER WHEEL

BACKGROUND OF THE INVENTION

1. Field of the Invention

This invention relates to apparatus which provides for a reduction of interior noise in high speed tracked vehicles, and more particularly to reduction of interior noise resulting from contact between track idler wheels and track shoes.

2. Description of the Prior Art

Noise production within a tracked vehicle results when vibration is generated, transmitted through the vehicle structure, radiated to the interior and amplified by resonant conditions. A typical track driven vehicle is structurally complex and has many sources of noise generation which are transmitted, radiated and resonated to produce an interior noise level. Reduction of the noise level by reducing the mass of the tracks or by increasing the diameter of idler wheels for the tracks has been implemented in the past. Nonetheless, relatively high interior noise levels have continued to exist due in part to structural vibrations resulting from track shoe impact on the track idler wheels. The impact is caused by the absorption of track shoe momentum directed normal to the track idler wheel rims. The vibration excitation results from the relatively instantaneous absorption of the track shoe momentum due to a relatively high stiffness of the track shoe because of the large area of contact between the idler wheel rim and elastomeric track shoe inserts which are positioned to contact the idler rims.

SUMMARY OF THE INVENTION

This invention relates to an idler wheel in combination with a track on a high speed tracked vehicle and wherein the track includes a plurality of spaced elastomeric inserts on the inner surface thereof. Power to the track is provided through a sprocket, and the track is mounted in tension about a plurality of road wheels and the idler wheel. The idler wheel is split into two spaced rim portions which come into contact with the elastomeric inserts as the track is guided therearound. In accordance with the present invention, the outwardly facing peripheral surface on the rim portions includes two spaced convex portions in transverse cross section so that the area of contact between the rim portions and the elastomeric inserts is relatively narrow as compared to prior art idler wheel structures and the compliance of the inserts when impacted by the rim portions is increased.

BRIEF DESCRIPTION OF THE DRAWINGS

FIG. 1 is a side elevational view of a typical tracked vehicle showing the relationship between the drive sprocket, the track and the idler wheel.

FIG. 2 is a fragmentary section through a portion of the track showing the mode of contact between the track and the idler wheel.

FIG. 3 is a section along the line 3—3 of FIG. 2 showing one embodiment of the present invention.

FIG. 4 is a section similar to FIG. 3 but showing another embodiment of the present invention.

FIG. 5 is a graph showing track shoe insert deflection as a function of idler rim-insert force for both the present invention and the prior art.

DESCRIPTION OF THE PREFERRED EMBODIMENTS

A high speed track driven vehicle is shown in FIG. 1 wherein a hull 11 has mounted on each side thereof a plurality of road wheels 12 and an idler wheel 13. A drive sprocket 14 extends from the side of the hull 11 at a position toward the front thereof having peripheral teeth which engage and drive a ground engaging track 16. An engine (not shown) is included within the hull 11 and is coupled to the drive sprocket 14 providing the power to drive the track 16. The track extends continuously from the periphery of the drive sprocket 14 beneath the ground support wheels 12, around the periphery of the idler wheel 13, and returns above the plurality of ground support wheels back to the drive sprocket 14.

The idler wheel 13 is located toward the rear of the hull 11, as shown in FIG. 1, although some vehicle configurations may locate the idler wheel toward the forward end of the vehicle. The manner in which the individual shoe assemblies 17 in the track 16 engage the periphery of the idler wheel 13 is shown in FIG. 2. Each of the track shoes 17 is coupled to the adjacent track shoes 17 by means of a linking pin inserted through bushings on the shoes. The track shoes 17 are seen to have a configuration including outwardly extending lateral cross ribs 19 which frictionally engage the underlying ground and drive the vehicle or which operate to react against surrounding water to propel the vehicle along the surface of a body of water. The inner surface of each track shoe 17 has an insert 21 of some durable elastomeric material. The insert 21 is of sufficient length and width so that under normal operating conditions the rim of the idler wheel 13 contacts the track shoe 17 solely in the area occupied by the elastomeric insert 21. It may be seen that when the track 16 is traveling at a considerable velocity when propelling the tracked vehicle at a high speed, the track shoes attain considerable momentum, a component of which is normal to the periphery of the idler wheel 13. As a consequence, the track contacts the periphery of the idler wheel while exerting a substantial normal force thereagainst. It is the impact of the shoes 17 against the periphery of the idler wheel 13 which is considered to be the major source of mechanical vibration transmitted from the idler wheel to the interior of the hull 11 which produces interior audible noise. Since that component of momentum of each track shoe 17 with which we are interested here is a function of shoe mass m and the velocity V of the shoe normal to the periphery of the idler wheel 13, and since the force F required to arrest that momentum normal to the idler wheel periphery is proportional to that component of momentum, the normal momentum is proportional to the impact force against the periphery of the idler wheel 13. It follows that for a reduction of the impact force F in the relationship $Ft = mV$ the time t must be increased. The manner in which this is accomplished in one embodiment of the invention may be shown by reference to FIG. 3. The idler wheel 13 is shown in fragmentary cross section having an outboard rim 22 and an inboard rim 23. An idler wheel spindle 24 has an annular mounting flange 26 thereon carrying a circular pattern of threaded studs 27. The mounting flange 26 has a boss 28 thereon. Each of the rims 22 and 23 has a central bore 29 and 31 therethrough, respectively, which is formed to closely surround the boss 28. The inboard and outboard rims also each have a circular pattern of through holes 32 which match the pattern of threaded studs 27. The threaded studs 27 have a length which is sufficient to pass through the holes 32 in the inboard and outboard rims and to extend therebeyond so that the ends of each of the studs may be engaged by a nut 33.

Both the outboard rim 22 and the inboard rim 23 have a plurality of lightening holes 34 therethrough separated by radially extending spokes 36 which extend from the inner annular portion of the rim to an outer annular rim portion 37 on the outboard rim and an outer annular rim portion 38 on the inboard rim.

The periphery of the annular rim portion 37 on the outboard rim 22 is seen to have an outwardly curved transverse contour which has no points of inflection relative to the axis of rotation of the spindle 24, and which provides a convex surface 39 on the rim portion 37. In like fashion, the periphery of the rim portion 38 has a cross section describing a curve having no points of inflection relative to the axis of rotation of the idler wheel spindle 24 and defining a convex surface 41. In addition, the rim portion 38 on the inboard rim 23 has an inner chamfered surface portion 42. The annular rim portions 37 and 38 are seen (FIG. 3) to be spaced so that track guides 44 depending from the track shoes 17 on the track 16 may pass therethrough. Inner chamfer 42 on the inboard rim portion 38 serves to repel the track guides 44 and prevent the track from "jumping" the idler wheel 13 toward the inboard side of the idler wheel. If a track 16 does jump the idler wheel, it will therefore be thrown from the outside of the idler wheel where repair and reassembly may be conveniently undertaken.

The function represented by the curves shown in FIG. 5, the ratio of deflection resulting from force applied between two members included in a mechanical system, is termed the compliance of the system. In general, compliance is the inverse of "stiffness". The convex surfaces 39 and 41 on the outboard and inboard rim portions of the idler wheel 13 serve to decrease the area of contact between the idler wheel rims and the elastomeric shoe inserts 21 as compared to the prior art rims having transversely flat rim portions. As a consequence, the compliance of the system including the inserts 21 and the idler wheel 13 is increased as may be seen by reference to the chart of FIG. 5. A dashed curve 43 indicates the dimension by which the convex surfaces 39 and 41 displace the elastomeric material in the inserts 21 as a function of the force in pounds therebetween as shown on the abscissa. For example, a force of approximately 250-300 pounds will cause the convex portions of the rims to "sink" into the insert 21 about 0.05 inches. It may be seen that a force of approximately 1,000 pounds will cause a 0.10 inch displacement in the elastomeric insert 21. The increase in the time t, which is required in the relationship $Ft = mV$ described hereinbefore, is obtained by virtue of the finite time requirement for displacement of the elastomeric material by the respective rim portion. FIG. 5 also shows the compliance of the deflection of the elastomeric inserts as a function of force between the inserts and the idler rim at the curve 46 for a standard rim having a flat transverse profile. The contact area between the standard rim with the flat profile and the elastomeric insert 21 being much greater than that described for the embodiments of the present invention, the deflection of the elastomeric insert 21 for a given force applied thereto is considerably less as shown by curve 46.

Turning now to FIG. 4, an alternate embodiment of the idler wheel of the present invention is shown wherein an outboard rim 47 and an inboard rim 48 have inner annular mounting portions with circular patterns of through holes 49 matching the circular pattern of the threaded mounting studs 37, as in the first described embodiment. The outboard and inboard rims of the idler wheel of FIG. 4 are mounted on the idler wheel spindle 24 by inserting the threaded studs 37 through the holes 49 and engaging the end of each stud with a nut 33 in the same fashion as described for the embodiment of FIG. 3. In like fashion, the rims of the idler wheel of FIG. 4 have lightening holes 51 therethrough which define spokes 52 supporting a rim portion 53 on the outboard rim and a rim portion 54 on the inboard rim. The periphery of the rim portion 53 is seen to form a contour in cross section which is defined by a curve having two points of inflection seen at 56 and 57. As a consequence, the periphery of the rim portion 53 includes two laterally spaced convex portions 58 and 59 which are seen as ridges or crowns running about the periphery of the rim. In like fashion, the periphery of the rim portion 54 describes a curve having two points of inflection 61 and 62 and, consequently, includes two spaced convex portions 63 and 64 running about the periphery of the inboard rim. As in the embodiment of FIG. 3, the idler wheel of FIG. 4 has a chamfer 66 on the inboard rim portion 54 so that track guides 44 passing through the space between the outboard and inboard rim portions 53 and 54 will be prone to move over the outboard rim portion 53 rather than the inboard rim portion 54 should the track 16 be thrown from the idler wheel for any reason. It should be noted that the idler wheel embodiment of FIG. 4 provides for the convex portions 59 and 64 to be on a greater radius from the axis of rotation of the idler wheel spindle 24 than the convex portions 58 and 63.

The convex portions 59 and 64 on the outboard and inboard rim portions 53 and 54 respectively function to absorb the intitial impact between the elastomeric inserts 21 on the track shoes 17 and the outboard and inboard rims of the idler wheel 13. The convex portions 59 and 64, being on a greater radius from the axis of rotation of the idler wheel spindle 24 than the convex portions 48 and 63, contact the surface of the elastomeric inserts 21 first at relatively small areas thereby increasing the compliance between the inserts and the idler rims and providing an increase in the time that force is applied to arrest the momentum of the track shoes normal to the periphery of the idler wheel 13. By the reasoning already discussed herein, the impact force is therefore reduced since the momentum of the shoes in the normal direction is unchanged. However, if the compliance of the elastomeric inserts 21 is increased to too great an extent, the idler rim portions 53 and 54 may contact the metal portions of the track shoes 17 at the longitudinal edges thereof causing a severe increase in audible noise within the hull 11. By way of preventing this from occurring the convex portions 58 and 63 of the rim portions 53 and 54 respectively are provided, such convex portions forming annular ridges or crowns which are located at a lesser radius from the axis of rotation of the idler wheel spindle 24 than are the convex portions 59 and 64. After the convex portions 59 and 64 are displaced the elastomeric insert material by a predetermined amount (e.g., approximately 0.085 inches) the contact area between the rim portions 53 and 54 and the elastomeric inserts 21 is increased by contact at the convex portions 58 and 63. Consequently, compliance is decreased as continued "digging in" by the rim portions into the elastomeric material of the inserts is decreased, and the rim portions will be retained in contact with the elastomeric insert material without engaging the longitudinal edges of the shoes.

The manner in which the dual crown rim portions of the idler wheel of FIG. 4 function may be seen by reference to the curve 67 in FIG. 5. Thus, as compared with curve 43 for the FIG. 3 idler wheel embodiment, compliance while the convex portions 59 and 64 are in contact with the elastomeric inserts is increased while compliance is decreased after contact is established between the inserts and the convex portions 58 and 63. For the lower force ranges a greater compliance is thereby seen for the embodiment of FIG. 4 than for the embodiment of FIG. 3. For example, a force of substantially less than 250 pounds will provide for displacement of the elastomeric insert material to a depth of approximately 0.05 inches as compared to the requirement of a force of slightly more than 250 pounds to produce the same deflection with the rim configuration of the FIG. 3 idler wheel. However, at the higher force levels, typically above 800 or 900 pounds, the compliance of the dual crown configuration of FIG. 4 is decreased relative to the single crown configuration. For example, a force of approximately 1200 pounds is required to provide an elastomeric material deflection of 0.10 inches for the idler wheel embodiment of FIG. 4 while with the single crown idler rim configuration of FIG. 3 only a force of approximately 1000 pounds is required to produce the same elastomeric material deflection.

Tests have shown that the idler wheel embodiment of FIG. 3 in a high-speed tracked vehicle traveling at 20 MPH provides approximately a 4.5 db noise reduction within the hull of the vehicle as compared to the noise level for the same vehicle utilizing an idler wheel having a flat transverse rim profile at the outer periphery thereof. The same tests have shown that the same vehicle traveling at a speed of 30 MPH will experience approximately a 3.5 db internal noise reduction with the FIG. 3 idler wheel configuration as compared to the standard flat rim idler wheel.

The driving sprocket 14 is generally constructed by combining a sprocket carrier, which is similar in construction to the idler wheel 13, and a pair of sprocket plates bolted to each side thereof. The sprocket plates carry peripheral teeth which engage the tracks for driving purposes. It is to be understood that the periphery of the sprocket carrier may be configured in a fashion similar to the idler wheel as described herein for the purpose of reducing mechanical vibrations and resulting interior audible noise in the vehicle. Consequently, the term "idler wheel" and "sprocket" will be used interchangeably in the appended claims where the novel structure may be used interchangeably.

Although the best modes comtemplated for carrying out the present invention have been herein shown and described, it will be apparent that modification and variation may be made without departing from what is regarded to be the subject matter of the invention.

What is claimed is:

1. In combination with a track on a high speed tracked vehicle wherein the track has mounted on the inner surface thereof a plurality of elastomeric pads, and wherein the track is driven by a sprocket and is mounted in tension about a plurality of road wheels, and idler wheel arranged to receive said track the idler wheel being split into two spaced rim portions having annular peripheral surfaces thereon which come into contact with the elastomeric pads and accepting passage of track guides through the space therebetween, the improvement wherein the annular peripheral surfaces of the rim portions each include two spaced convex portions in transverse cross section, whereby the area of contact between said rim portions and the elastomeric pads is relatively small.

2. The combination of claim 1 wherein one of said convex portions on each rim portion extends to a greater radius from the axis of rotation of said rim portions than does the other convex portion on the rim portion.

3. An idler wheel adapted to be mounted for rotation on an idler wheel spindle for reducing noise within the hull of a high speed tracked vehicle having tracks with inner elastomeric shoe inserts operating to contact the idler wheel rim, comprising inner and outer axially spaced rims mounted on the idler wheel spindle, the radially outer peripheral surface on each of said inner and outer rims having two laterally spaced convex portions in cross section so that the area of contact between said inner and outer rims and the elastomeric shoe inserts is relatively small whereby the compliance between the shoe inserts and said rims is enhanced.

4. An idler wheel as in claim 3 wherein one of said convex portions on each peripheral surface extends to a greater radius from the axis of rotation of the idler wheel spindle then the other convex portion.

5. An idler wheel adapted to be mounted for rotation on an idler wheel spindle extending from the hull of a high speed tracked vehicle having tracks with inner elastomeric shoe inserts which contact the idler wheel, comprising inner and outer axially spaced rims mounted on the idler wheel spindle, a radially outer peripheral surface on each of said inner and outer rims having an outwardly curved transverse cross section, at least one of said peripheral surfaces describing a curve in transverse cross section having two points of inflection and two convex portions, one of said convex portions extending to a greater radius from the axis of rotation of the idler wheel spindle than the other, whereby the area of contact between said peripheral surfaces and the elastomeric shoe inserts is relatively narrow and the compliance therebetween is enhanced, said convex portion extending to a greater radius operating to absorb initial contact shock between said peripheral surface and the shoe insert thereby reducing internal hull noise and said other convex portion operating to subsequently increase the area of contact and reduce compliance.

6. Apparatus for reducing audible noise within a hull of a high speed tracked vehicle, comprising a plurality of road wheels, a driver wheel and an idler wheel mounted for rotation on each side of the hull, a linked ground engaging track including a plurality of serially coupled track shoes extending around said plurality of road wheels and said driver and idler wheels and being driven by said driver wheel, said idler wheel having a peripheral rim with two adjacent laterally spaced convex portions in cross section, an elastomeric insert in each track shoe disposed to contact said peripheral rim when passing thereby, one of said convex portions extending to a greater radius from the axis of rotation of the idler wheel than the other, so that the area of contact between said elastomeric inserts and said convex rim portions is relatively small, whereby the compliance between said peripheral rim and said elastomeric inserts is reduced for increasing force therebetween.

* * * * *